(12) United States Patent
Mehra

(10) Patent No.: US 7,533,401 B2
(45) Date of Patent: May 12, 2009

(54) DIGITAL DATA PROCESSING FROM MULTIPLE STREAMS OF DATA

(76) Inventor: Rahul Mehra, 17 Meadow Park Crescent, Pudsey, Leeds, LS28 7TN (GB)

(*) Notice: Subject to any disclaimer, the term of this patent is extended or adjusted under 35 U.S.C. 154(b) by 568 days.

(21) Appl. No.: 09/805,867

(22) Filed: Mar. 14, 2001

(65) Prior Publication Data

US 2001/0052129 A1    Dec. 13, 2001

(30) Foreign Application Priority Data

Mar. 15, 2000   (GB)   ................................ 0006095.4

(51) Int. Cl.
*H04N 7/18* (2006.01)
(52) U.S. Cl. .............................. 725/71; 725/67; 725/68; 725/70; 725/74; 725/78; 725/82; 725/85; 725/131; 725/151; 348/423.1; 370/389; 370/399; 370/390; 370/431; 370/432; 370/535; 370/536; 370/537; 370/538; 370/539; 370/540; 370/541; 370/542
(58) Field of Classification Search ................ 725/74, 725/78, 82, 85, 68, 131, 139, 151, 67, 70–71; 348/423.1; 370/389–390, 431–432, 535–542; 375/240.25–240.29
See application file for complete search history.

(56) References Cited

U.S. PATENT DOCUMENTS

| | | | | |
|---|---|---|---|---|
| 5,600,378 A | * | 2/1997 | Wasilewski | 348/468 |
| 5,822,014 A | * | 10/1998 | Steyer et al. | 725/41 |
| 6,002,687 A | * | 12/1999 | Magee et al. | 370/394 |
| 6,069,621 A | * | 5/2000 | Schupak | 715/717 |
| 6,134,419 A | * | 10/2000 | Williams | 725/151 |
| 6,215,530 B1 | * | 4/2001 | Wasilewski | 348/731 |
| 6,351,474 B1 | * | 2/2002 | Robinett et al. | 370/486 |
| 6,483,547 B1 | * | 11/2002 | Eyer | 348/473 |
| 6,621,528 B1 | * | 9/2003 | Kessler et al. | 348/734 |

(Continued)

FOREIGN PATENT DOCUMENTS

EP              0917355 A1        5/1999

(Continued)

OTHER PUBLICATIONS

Abstract 01302225.6.

*Primary Examiner*—Jason P Salce
(74) *Attorney, Agent, or Firm*—Head, Johnson & Kachigian

(57) ABSTRACT

The invention relates to a system and method for the generation of television channels and which allows the generation of the same by the processing and selection of designated packets of data from multiple data transport streams, which each transport stream including numerous packets of data. In each transport stream the packet of data is identified by the allocations of a packet identification code (PID) and each is held in the transport packet which is transmitted as part of each transport stream. In accordance with the invention, and in order to prevent errors and inaccurate packet selection, a Transport Stream Identification Code (TSID) is allocated to each of the transport streams of data received. Typically the TSID is located in the transport packet for each transport stream of data. In the selection of a packet of data, the appropriate TSID is referred to identify the appropriate transport stream and the PID then referred to identify the packet of data from that transport stream.

6 Claims, 1 Drawing Sheet

U.S. PATENT DOCUMENTS 6,681,397 B1 * 1/2004 Tsai et al. .................. 725/92
6,718,552 B1 * 4/2004 Goode ....................... 725/95
6,738,983 B1 * 5/2004 Rao et al. .................. 725/120
6,779,195 B2 * 8/2004 Oishi et al. ................. 725/68

FOREIGN PATENT DOCUMENTS

EP 1032195 A2 8/2000
WO WO98/16067 4/1998

* cited by examiner

DIGITAL DATA PROCESSING FROM MULTIPLE STREAMS OF DATA

CROSS-REFERENCE TO RELATED APPLICATIONS

This application claims priority to GB Application No. 0006095.4 filed 15 Mar. 2000.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

The invention to which this application relates is the processing of data which is received from a remote location, and typically data which is broadcast by a broadcaster, to a number of receivers, each provided in the premises of a subscriber. The data can represent any, or any combination, of video, audio and/or auxiliary data such as text and the receiver can process the data into a format for viewing and/or listening by a user via a display screen and/or speakers such as are provided in a television set. The television set can be connected to the receiver or the receiver can be provided as an integral part of the television set.

Typically, the digital data which is received is transmitted in multiple streams of data such as, for example a number of streams of video data, a number of audio data streams and so on. When received the data includes information for the receiver which allows the receiver to combine appropriate data streams together, such as an audio and video data stream, to form an identifiable television program which can be watched by the user of the apparatus when they select the same. One form of receiver could include processing means which allow each stream of data to be processed into a form ready for display or listening, if selected. However this form of the receiver apparatus would be prohibitively expensive due to the need for a number of processing means for each data stream.

A known solution to this problem is set out in the applicant's co-pending patent application wherein the receiver is required to combine and construct from the multiple streams, a single combined stream of data which can then be processed using processing software and/or hardware in the receiver. As there is only a need to process the combine data stream the processing means required is reduced and hence a receiver incorporating this feature can be manufactured at a commercially beneficial price.

The question of how the single stream of data can be constructed and combined from data packets from the plurality of streams of data which are received by the receiver is addressed in one form in the applicant's co-ending application.

BRIEF SUMMARY OF THE INVENTION

The aim of the present invention is to provide further an alternative means of compiling and constructing the said single stream of data from the multiple streams of data received.

In a first aspect of the invention there is provided a data processing system for data received by a broadcast data receiver, said receiver provided for receiving multiple streams of digital data which are transmitted from a remote location, said data in each stream comprising a series of packets of data and provided with associated codes to indicate the type of data i.e. video, audio and/or auxiliary data, said receiver provided with means which allow the selection and combination of packets of data from the said multiple streams of data in response to control commands, said selected packets of data combined to form a single stream of data and said single stream of data further processed to generate video and/or audio and/or auxiliary data, each stream of data including a transport packet of identification codes for the packets of data in the stream and characterized in that an identification code is added to the streams of data which serves to identify and differentiate each of the streams of data received by the receiver.

In one embodiment the identification code is located with a transport packet of data which includes a series of identification codes housed which contain information relating to the packets of data in that stream of data. Typically, the identification code identifies the transport packet of the data stream (TSID).

In one embodiment the range of available identification codes can be extended by re-using existing, superfluous bits within the existing transport packet syntax, said bits replaced by an identification code or codes which identifies the streams of data being received.

In a further embodiment of the invention the additional identification codes are added by means of adding additional interface wires to the output of the device that combines the transport streams together.

In a yet further embodiment of the invention the identification codes for the multiple data streams are stored in a memory device to allow subsequent referral by the receiver to identify data streams.

Typically the single transport stream which is generated by the multiplexing system includes selected packets of data from the streams of data received. The packets of data may be selected automatically as they represent data which is required for the system to operate correctly, and/or in response to user selections such as to watch a particular channel, a pre recorded program and/or to record programs and it should be appreciated that another feature of the invention is the ability to split the data from the transport streams and to select to multiplex data into a single stream, store/record data and/or discard data in accordance with operating parameters at any instant and with reference to the identification codes allocated to each of the transport streams of data, thereby allowing the selection of the required packets of data to form the single data transport stream.

The arrangement of the current invention allows data which has been received from a number of transport streams to be processed using integrated circuits which can accept one data input as the integrated circuits are presented which data in a single transport stream. These integrated circuits for the further processing of the data can be the same as those currently included in the receiver with no, or limited, alteration to perform processing of multiple transport streams of data which, until now, has not been possible.

Typically, the single transport data stream which is generated is presented to a single input component or components in the receiver for further processing and to allow the data to be used to perform the designated function. The designated function can be any or any combination of the generation of video displays, audio displays, recording of programs, playback of recorded programs, generation of electronic program guides, linking with internet services, e-mail, interaction with a PC, video and so on.

In a further aspect of the invention there is provided a method for the generation of a single stream of data for subsequent processing, from multiple transport streams of data, said method comprising the steps of receiving a number of transport streams of data, and selecting packets of data in accordance with user and/or receiver selection criteria and multiplexing the said selected packets of data into a single stream of data and characterized in that an identification code (TSID) is allocated to each of the received transport streams of data and when the selection of a data packet is required, the selection is controlled with reference to an appropriate identification code for the particular transport stream of data in which the data packet to be selected is located and the required data packet selected therefrom.

Typically, the particular data packet is selected from the selected transport stream of data with reference to the PID (Packet Identification Code). Thus in accordance with the invention, the selection of the data packet can only be made from the transport stream of data identified by the TSID.

Typically at least one of the received transport streams of data is broadcast data received from a remote location and containing any or any combination of audio, video and auxiliary services data.

In one embodiment the identification codes are allocated to each transport stream of data prior to broadcast and the receiver, includes, in memory a list of the identification codes. Alternatively the identification codes are allocated at the time of reception at the receiver. Thereafter the selection of the packets of data from the required transport stream is performed in accordance with controls signals generated by the receiver in response to user command, to allow, for example, the generation of a particular television channel on video and audio apparatus connected to the receiver. Thus, by allowing the selection of data under the control of the receiver so the required packets of data can be multiplexed into a single stream and avoid clashes between packet of data from different transport streams.

BRIEF DESCRIPTION OF THE DRAWING

Specific embodiments of the invention will now be described with reference to the accompanying FIGURE.

DETAILED DESCRIPTION OF THE INVENTION

Figure 1:
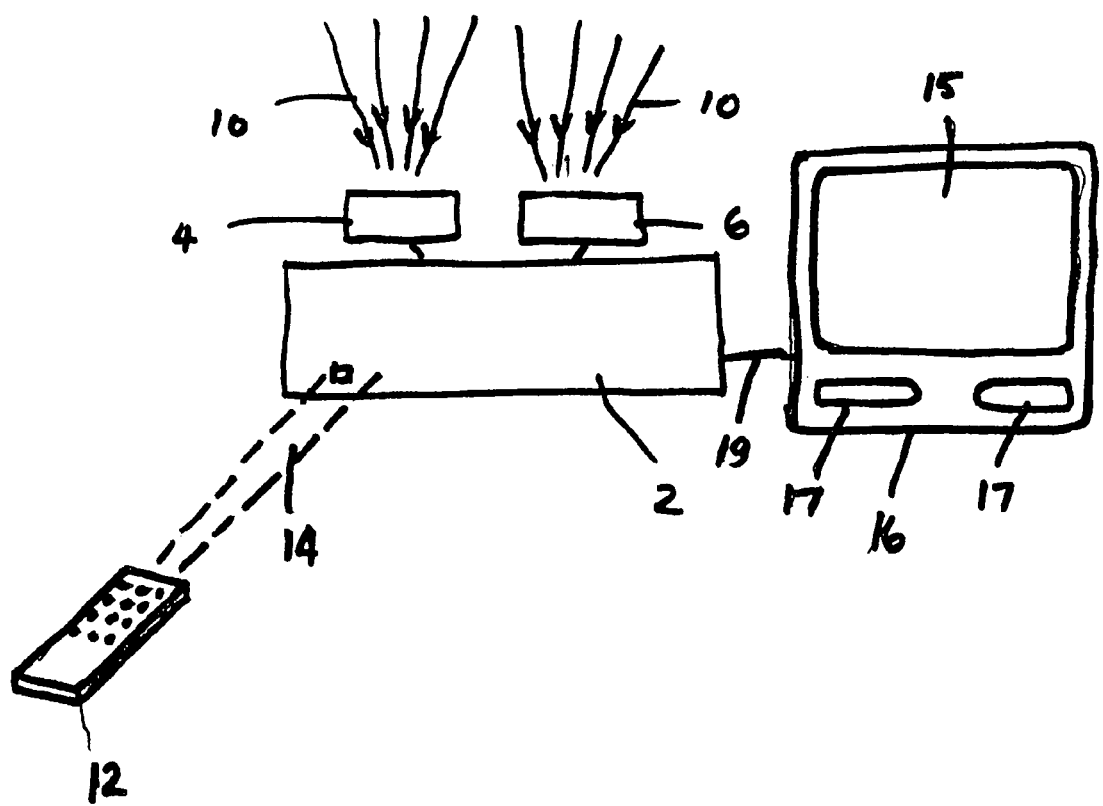
FIG. 1 illustrates in schematic fashion a system which can use the inventive system of this application.

There is provided a receiver, indicated by the general numeral 2 in the accompanying diagram, which is provided to receive multiple broadcast transport streams of data, indicated by the general reference 10, typically transmitted via any of satellite, cable or terrestrial transmission systems. The streams of data are received at the receiver by, in this case, a first tuner 4 and a second tuner 6, both of which receive selected broadcast data transport streams from remote sources. When the data arrives at the receiver from the remote broadcast location a number of transport streams of data are received. Each of the transport streams of data, in accordance with the invention, upon reception, includes an identification code for the transport stream which is provided in the following manner.

Each of the multiple data transport streams which are incoming to the receiver conventionally includes a transport packet in accordance with the International Standards for the transmission of data as set out in MPEG-2 (Motion Pictures Advisory Group). Conventionally each data stream includes a series of packets of data and the transport packet includes packet identification codes (PID's) which allow the receiver to identify the packets of data in that data stream. However there is a problem in that the available PID's which can be used may run out or there may be more than one packet of data across the streams of data which has the same PID leading to errors and incorrect selection of data packets. As a result of this the packets of data cannot be identified accurately and, as a result may not be properly selected. In accordance with this invention, the range of available PIDs and accuracy of selection of packets of data is increased, by increasing the capacity of each transport packet in terms of additional bits being available to be used. With additional bits so created, they are used to identify the transport packet for each transport stream by generating a transport stream Identification code (TSID). Thus, for each transport stream there is provided a TSID for the transport packet for that stream of data and for that stream there is provided a series of PID's which serve to identify the packets of data uniquely with respect to that particular transport stream.

By doing this, when a selection of a packet of data is required, the same can be defined by the control system for the receiver which controls the selection of packets of data. The required packet of data is firstly defined by indicating the TSID for the appropriate transport stream of data in which the required packet of data is located and then, with reference to that transport stream, reference is then made to at the appropriate PID for the packet of data so as to allow the selection of the required packet of data from that transport stream. Thus, as a result of this system and method there is no possibility when reference is made to the PID of there being more than one packet of data in that data stream having the same PID and so no error in selection can be made because of this.

An alternative or additional example of a solution to the problem is to extend the range of available bits to allow for the generation of the TSID, not by increasing the size of the transport packet but rather by identifying and re-using existing, superfluous bits within the existing transport packet syntax. For example, each transport packet currently starts with 0x47 byte. This syntactic element can be checked for, prior to the time domain multiplexing of the transport streams. Once the syntax has been checked, the 0x47 byte can be replaced with a TSID identifier which distinguishes the different transport steams from each other in a similar fashion to the method already described above.

A yet further alternative is to extend the range of the available PIDs by adding additional interface wires to the output of the device that is used to combine the transport streams together. The additional wires can also be required on any device that uses the output of the TS combiner. The wires are encoded with the TSID for the duration of packet transfer between devices. The TSID can then be used in a similar fashion to the two previous methods described.

Typically the TSID information is allocated to each data transport stream at the time of broadcast by the broadcaster and information sent to the receivers to allow them to refer to and identify the TSID's which have been set. In one embodiment the TSID codes once received, for the output transport stream packets can be held in a memory device in the receiver such as in the form of a FIFO (First In First Out) buffer which is then read by a connected device when it wishes to determine a unique component ID.

Referring once more to the diagram an example of operation is now provided. If a user selects to watch a particular program on a particular channel say by operating remote control device 12 and sending an infra red control signal 14 to the receiver, the signal is processed, the channel identified and typically packets of data may be required to be selected from more than one data stream. This could be required to allow for example, the combination of video data from one data stream, audio data from a second data stream and auxiliary data from a third data stream which in conjunction allow the generation of the selected channel on the video display 15 and speakers 17 of, in this example a television set 16 connected 19 to receive the data output from the receiver once the appropriate data packets have been selected.

The receiver 2 upon receiving the channel selection from the user refers to channel reference information held in memory in the receiver which identifies to the receiver and is used to control the receiver to seek and select specific packets of data from the data streams which are required from the generation of the selected channel.

In accordance with the invention, the first part of the selection is for the receiver to be provided with the appropriate TSID identification codes which identifies the particular data streams in which the packets of data are located. The receiver then seeks and finds the appropriate data stream for the required packet of data, and then refers to the PID and seeks for the particular packet of data in the data stream only and when it finds the same, selects the same and adds to the single stream of data required for the generation of the selected channel. This process is then repeated for each packet of data required from the data streams and the packets of data sought and selected in the order determined and controlled by the information relating to the requirements for generation of the particular channel. This information is normally periodically transmitted by the broadcaster to the receiver. As this process continues so the video, audio and auxiliary data can be processed and used to generate to the user the selected channel.

Thus the system and method herein illustrated allow packets of data to be uniquely identified from within a time-domain multiplexing of multiple transport streams.

While the invention has been described with a certain degree of particularly, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

The invention claimed is:

1. A data processing system for data received by a broadcast data receiver, said system comprising:
 a broadcast data receiver provided for receiving multiple transport streams of digital data which are transmitted from remote locations and may be from different sources, said digital data in each transport stream including a series of packets of data provided with associated codes to indicate the type of data i.e video, audio and/or auxiliary data;
 said receiver provided with a plurality of tuners, each of which receives a transport stream of digital data;
 said receiver provided with means which allow the selection and combination of packets of data from said multiple transport streams of data multiplexed into a single stream of data in response to control commands;
 said selected packets of data combined and further processed to generate video and/or audio and/or auxiliary data therefrom; and
 each transport stream of data including transport packets provided with packet identification codes for the packets of data in the stream, and a transport stream identification code added to each of the transport packets at a position other than that of the packet identification code so as not to change the packet identification codes and identify and differentiate each of the packets of data in terms of the specific stream of data from which they originate, and selection of the appropriate data packets to form the said multiplexed single stream of data received by the receiver, and wherein the addition of the transport stream identification code allows the differentiation of a packet of data in a first transport stream from any packet of data in a further transport stream which has the same packet identification code.

2. A data processing system according to claim 1 wherein the identification codes are generated by re-using existing, superfluous data bits within the existing transport packet syntax said bits replaced by the identification code or codes which identify the streams of data being received.

3. A data processing system according to claim 1 wherein the identification codes for the multiple data streams are stored in a memory device and reference to said memory by the receiver allows the identification of each of the data streams with reference to the identification codes accompanying the transmitted data streams.

4. A method for generation of a single stream of data for subsequent processing, from multiple transport streams of data, said method comprising the steps of:
 simultaneously receiving a number of different transport streams of data via a plurality of tuners in a receiver;
 selecting packets of data from said different transport streams in accordance with user and/or receiver selection criteria;
 multiplexing said selected packets of data into a single stream of data by said receiver;
 allocating a transport stream identification code to each of the selected packets of data;
 allocating a packet identification code to each of the selected packets of data;
 further selecting the multiplexed data packets with reference to the packet identification code allocated to each of the selected packets of data for the multiplexed single stream of data;
 repeating the steps for each of the data packets required to output a particular channel, wherein the allocating of the transport stream identification code for each of the selected packets of data which is received, differentiates packets of data contained in other received transport streams which have the same packet identification code; and
 wherein the transport stream identification codes are allocated at a position in the packet other than that of the packet identification code so as not to modify the packet identification codes.

5. A method according to claim 4 wherein the particular data packet is selected from the selected transport stream of data with reference to the packet identification code.

6. A method according to claim 4 wherein the selection of the data packet can only be made from the transport stream of data identified by the transport stream identification.

* * * * *